United States Patent [19]
Wazybok et al.

[11] Patent Number: 5,251,244
[45] Date of Patent: Oct. 5, 1993

[54] NUCLEAR FUEL PELLET LOADING SYSTEM

[75] Inventors: David F. Wazybok, Castle Hayne, N.C.; Bobby R. Cosper, Piedmont, S.C.; Harold B. King, Jr., Wrightsville Beach, N.C.; David K. Underwood, Stokesdale, N.C.; James E. Pierce, Wilmington, N.C.

[73] Assignee: General Electric Company, San Jose, Calif.

[21] Appl. No.: 933,279

[22] Filed: Aug. 21, 1992

[51] Int. Cl.$^5$ .............................................. G21C 21/00
[52] U.S. Cl. ...................................... 376/261; 53/542
[58] Field of Search ................ 376/261, 260; 53/154, 53/237, 247, 249, 250, 244, 276, 502, 525, 542, 252; 414/146

[56] References Cited

U.S. PATENT DOCUMENTS

| | | | |
|---|---|---|---|
| 3,735,550 | 5/1973 | Moore et al. | 53/510 |
| 3,907,123 | 9/1975 | Howell | 376/261 |
| 3,925,965 | 12/1975 | Rushworth | 376/261 |
| 3,940,908 | 3/1976 | Dazen et al. | 376/261 |
| 3,965,648 | 6/1976 | Tedesco | 376/261 |
| 4,235,066 | 11/1980 | King et al. | 376/261 |
| 4,292,788 | 10/1981 | King | 53/542 |
| 4,748,798 | 6/1988 | Udaka et al. | 376/261 |
| 4,980,119 | 12/1990 | Schoenig, Jr. et al. | 376/261 |

Primary Examiner—Daniel D. Wasil
Attorney, Agent, or Firm—J. S. Beulick

[57] ABSTRACT

A nuclear fuel pellet loading system includes pellet handling apparatus and cladding tube handling apparatus functionally interfaced by a bushing assembly. Pellet rows of varying zone lengths are alternately built up on two tracks, measured for zone length, weighed and then loaded by separate pusher carriages through separate bushing assembly passageways into a pair of empty cladding tubes indexed into loading positions by the tube handling apparatus. Separate zone interface tapes affixed to the pusher carriages indicate to an operator the length each pellet zone is to be built to. The tube handling apparatus accommodates cladding tubes of varying lengths and is equipped to automatically read a serial number imprinted on each tube endplug.

18 Claims, 11 Drawing Sheets

NUCLEAR FUEL PELLET LOADING SYSTEM

The present invention relates to the manufacture of nuclear fuel rods utilized in reactor cores and particularly to apparatus for loading fuel pellets into cladding tubes.

BACKGROUND OF THE INVENTION

The core of a typical nuclear reactor may include 40,000 or more fuel rods, each containing a column of hundreds of fuel pellets. The fuel rods are arranged to generate controlled amounts of heat in specific regions of the core. Controlled heat generation is largely achieved by organizing the pellet columns in specified zones of varying lengths and uranium enrichment concentrations. Current designs call for fuel rods having as many as seven pellet zones of various specific lengths and four or more different enrichment concentrations.

Proper operation of a reactor critically depends not only on the locations of the various types of fuel rods within the core, but also on the locations of the various pellet zones of specified enrichments in the pellet column of each fuel rod. Thus, to assure requisite control of the heat generated in a reactor core such as to decrease local power peaking, to improve the power distribution throughout the bundles of fuel rods, and to provide adequate reactor shutdown margin, it is critical that the fuel rods be manufactured strictly in accordance with engineering specifications to comply with safety and regulatory requirements. Thus, each and every fuel pellet must be in a prescribed location within the pellet column according to enrichment concentration in order to achieve requisite enrichment zone lengths and zone interface positions along the column length.

As the number of enrichment zones per pellet column increases, so does the potential for manufacturing error. Thus more rigorous quality assurance measures must be instituted. Pellets of different enrichments must be maintained segregated, tracked and accounted for throughout the loading process. Each pellet enrichment zone must be precisely made up to exacting length and weight specifications and loaded into a fuel rod or cladding tube in the proper order to assure its requisite positioning in the pellet column. That is, the fuel rod must be loaded by pellet zones in accordance with predetermined engineering specifications or so-called "rod maps". Another quality assurance check is the vacant space left in the cladding tube after the last pellet zone has been loaded, which ultimately provides a plenum chamber when the tube is sealed with an end plug as the final fuel rod manufacturing step. A record must be kept of the specifications to which each rod was loaded with pellets so that the rods can be assembled into fuel bundles in proper positions.

SUMMARY OF THE INVENTION

The present invention is an improvement over commonly assigned King—U.S. Pat. No. 4,292,788, entitled "Nuclear Fuel Rod Loading Apparatus", the disclosure of which is specifically incorporated herein by reference. The nuclear fuel pellet loading system of the present invention includes pellet handling apparatus and cladding tube handling apparatus, which are functionally interfaced by an improved bushing assembly. The pellet loading apparatus includes a pair of tracks on which fuel pellets are manually placed in rows consisting of multiple, end-to-end zones of specified lengths, weights and enrichments. In the meantime, the cladding tube handling apparatus arranges a pair of cladding tubes in loading positions respectively aligned with the two tracks. Once the makeup of one row of pellets is completed, a separate loader assembly pushes the pellet row along its track, through the bushing assembly and into the aligned one of the cladding tubes. While one of the tubes is being loaded with pellets, the makeup of the other row of pellets is commenced. As each pellet zone of a row is made up, the associated pusher assembly is activated to obtain a length measurement for each zone, and the row of pellets is weighed to determine each zone weight.

The cladding tube handling apparatus accepts a batch of tubes and automatically feeds the tubes in succession from an input queue through a reading station to an indexer operating to bring successive pairs of tubes into respective preload positions. At the reading station, each tube is axially translated in one direction to a reading position where a unique serial number borne by the tube endplug is read. The tube is then axially translated in the opposite direction to properly locate the open tube end for positioning to its preload position by the indexer. A pair of grippers reciprocate the pair of tubes between their preload positions and loading positions with their open ends communicating with the bushing assembly to smoothly accept a row of pellets being pushed thereinto. From the indexer the loaded cladding tubes or fuel rods propagate to an output queue.

The invention accordingly comprises the features of construction, combination of elements and arrangement of parts, all as detailed hereinafter, and the scope of the invention will be indicated in the claims.

BRIEF DESCRIPTION OF THE DRAWINGS

For a full understanding of the nature and objectives of the present invention, reference may be had to the following Detailed Description, taken in connection with the accompanying drawings, in which.

Corresponding reference numerals refer to like parts throughout the several views of the drawings.

DETAILED DESCRIPTION

Figure 1:
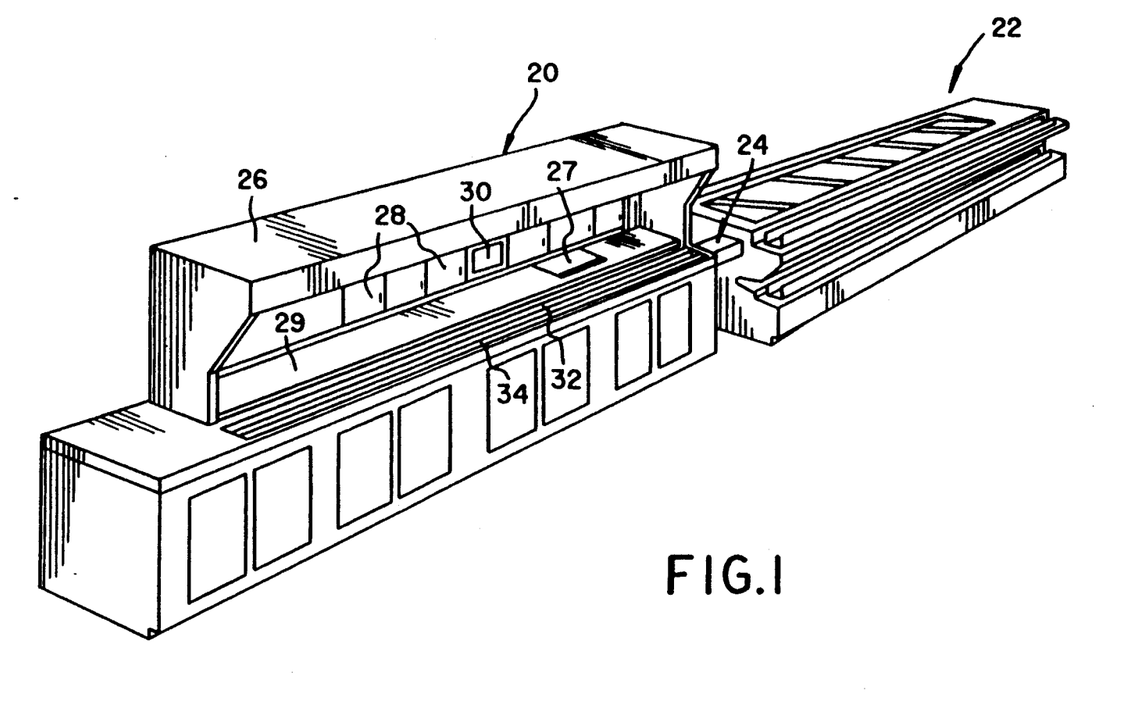
FIG. 1 is a perspective view of a nuclear fuel pellet loading system constructed in accordance with the present invention to include pellet handling apparatus 20, cladding tube handling apparatus 22, and an interfacing bushing assembly 24.

The nuclear fuel pellet loading system of the present invention includes, as illustrated in FIG. 1, pellet handling apparatus, generally indicated at 20, cladding tube handling apparatus, generally indicated at 22, and an interfacing bushing assembly, generally indicated at 24. The pellet handling apparatus includes a cabinet 26 in which are stored trays 27 loaded from the cabinet rear. Each tray contains fuel pellets of a given enrichment and is labelled accordingly. A display associated with each of a series of doors 28 indicates which door must be opened to manually access a tray containing pellets of a given enrichment. The accessed trays are slid out onto a counter 29, and the operator reads the tray labels into a system controller (not shown). Verification that the correct trays have been accessed is displayed to the operator on a monitor 30.

Forwardly of counter 29, the pellet handling apparatus includes a pair of elongated, side-by-side tracks 32 and 34 having loading or forward ends juxtaposed with bushing assembly 24. The operator scoops the disc-shaped pellets from the trays and places then on-edge on the tracks zone-by-zone, with consecutive zones containing fuel pellets of differing enrichments. As described below, after each pellet zone is made up on one of the tracks by the operator to a length marked by a zone interface indicator, its zone length and weight are automatically measured, and the values obtained are entered into the system controller. The controller can then confirm to the operator that the pellets are being arranged on the track in strict accordance with a predetermined "rod map" entered therein. If the controller finds a zone length and/or weight discrepancy, the operator is alerted and the process of building up the row of pellets is halted until the problem is resolved. The controller can also keep track by weight of the pellets taken from each of the trays and thus know when a particular tray should be depleted of pellets and so indicate to the operator. By appropriate keyboard entries, the operator confirms or denies the existence of an empty pellet tray. If a denial, the problem is noted for resolution.

Figure 2:
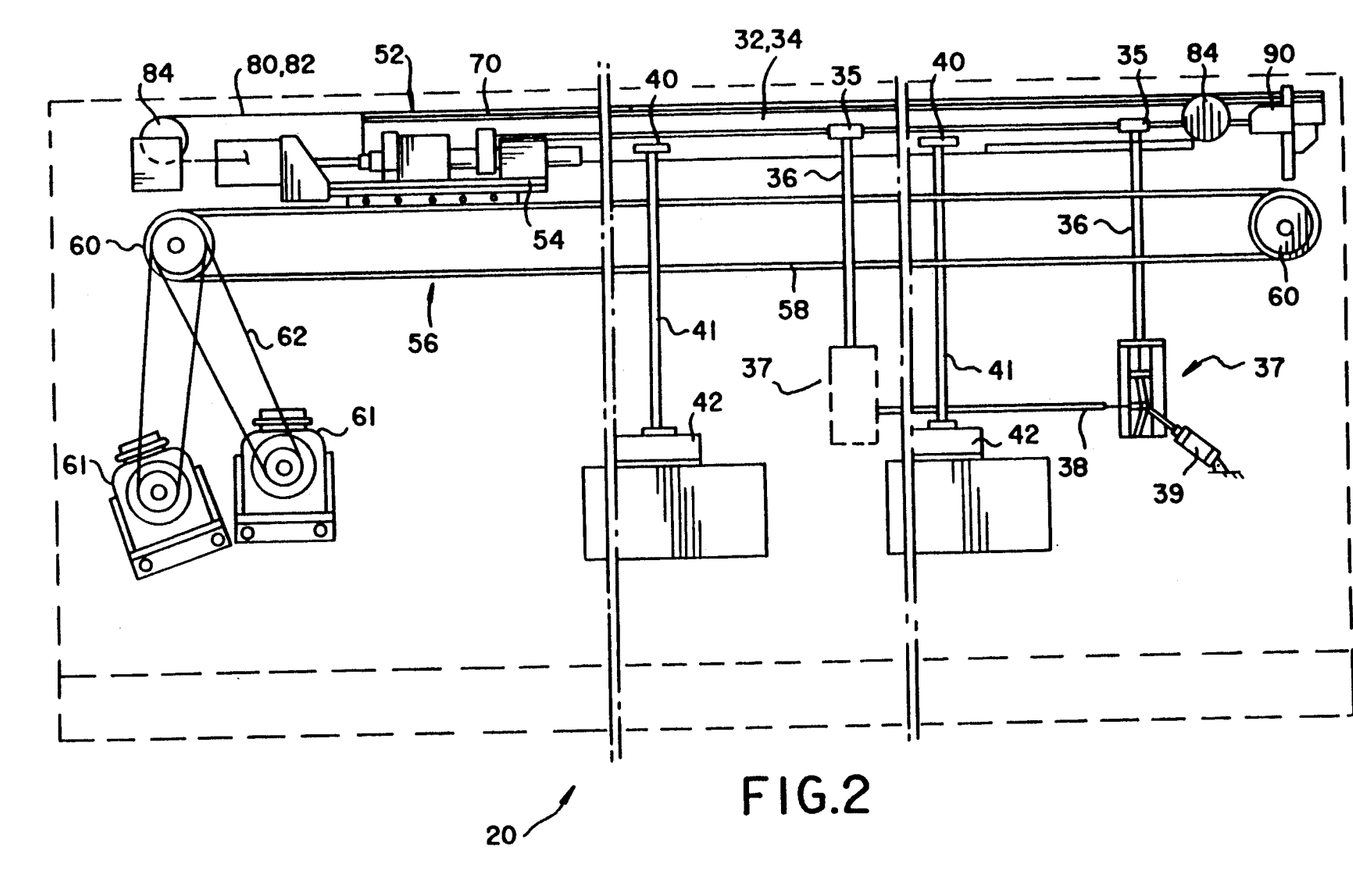
FIG. 2 is an elevational view, partially in section and partially broken away, of the pellet handling apparatus of FIG. 1.
Figure 3:
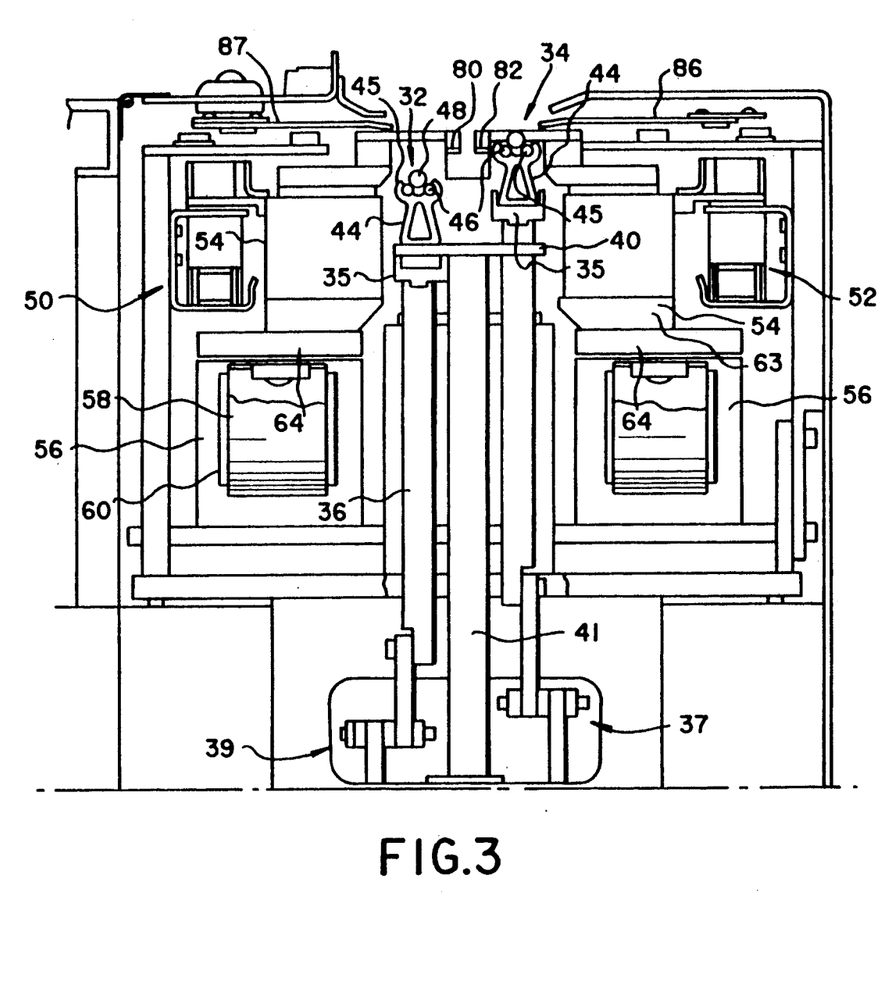
FIG. 3 is a transverse sectional view illustrating loader assemblies utilized in the pellet handling apparatus of FIG. 2.

Referring jointly to FIGS. 2 and 3, each track 32, 34 rests on a separate elevator unit comprising a longitudinally distributed series of saddles 35 affixed to the upper ends of vertical elevator posts 36 whose lower ends are connected to separate toggle mechanisms, generally indicated at 37. The toggle mechanisms of each elevator unit are ganged together by horizontal connecting rods 38. Each elevator unit is operated by a separate linear actuator 39 (FIG. 2) acting to raise the tracks to pellet loading positions by straightening the toggle mechanism links. The tracks are then lowered when the actuators collapse the toggle mechanism links. As the tracks are lowered one at a time, they come to rest solely on a pair of transversely elongated scale bars 40 carried at the upper ends of scale posts 41 for a pair of electronic scales 42 which then can separately read the weight of the pellets on each of the tracks into the system controller.

As best seen in FIG. 3, each track 32, 34 consists of an elongated aluminum extrusion having an open, pyramidal-shaped base 44 which rests on the saddles 35. Upstanding from the track base are a pair of coextensive side pockets 45 of semi-circular cross section. The side pockets slidingly receives coextensive, stainless steel rods 46, which are held in place by suitable fasteners (not shown) at each end of the track base. The rods of each track provide an essentially V-shaped trough for supporting fuel pellets 48 arranged on their peripheral edges, both at rest and during sliding motion along the tracks incident to loading cladding tubes. By virtue of the extrusion cross sectional configuration, the tracks will retain a true straightness over time. Also, should the rods 46 become worn or damaged, they can be easily replaced at minimal expense.

As seen in FIG. 3, track 32 is served by a loader assembly, generally indicated at 50, while track 34 is served by an identical loader assembly, generally indicated at 52. Each loader assembly includes a carriage 54 which is longitudinally reciprocated along the length of the track it serves by a linear translator 56. The linear translator, which may take a variety of forms, is illustrated in FIGS. 2 and 3 as comprising an endless gear belt 58 trained about fore and aft pulley gears 60 with its upper horizontal run connected to a carriage 54. The gear belts of the two translators are driven by separate motor drive units 61 via drive gear belts and pulley gears, generally indicated at 62. Each drive unit includes an encoder capable of continuously tracking the position of its carriage and reading carriage position data into the system controller. The system controller can then independently control the movements and positionings of the two carriages. Translators, as generally described, are marketed by Star Linear Systems of Charlotte, N.C.

Figure 4:
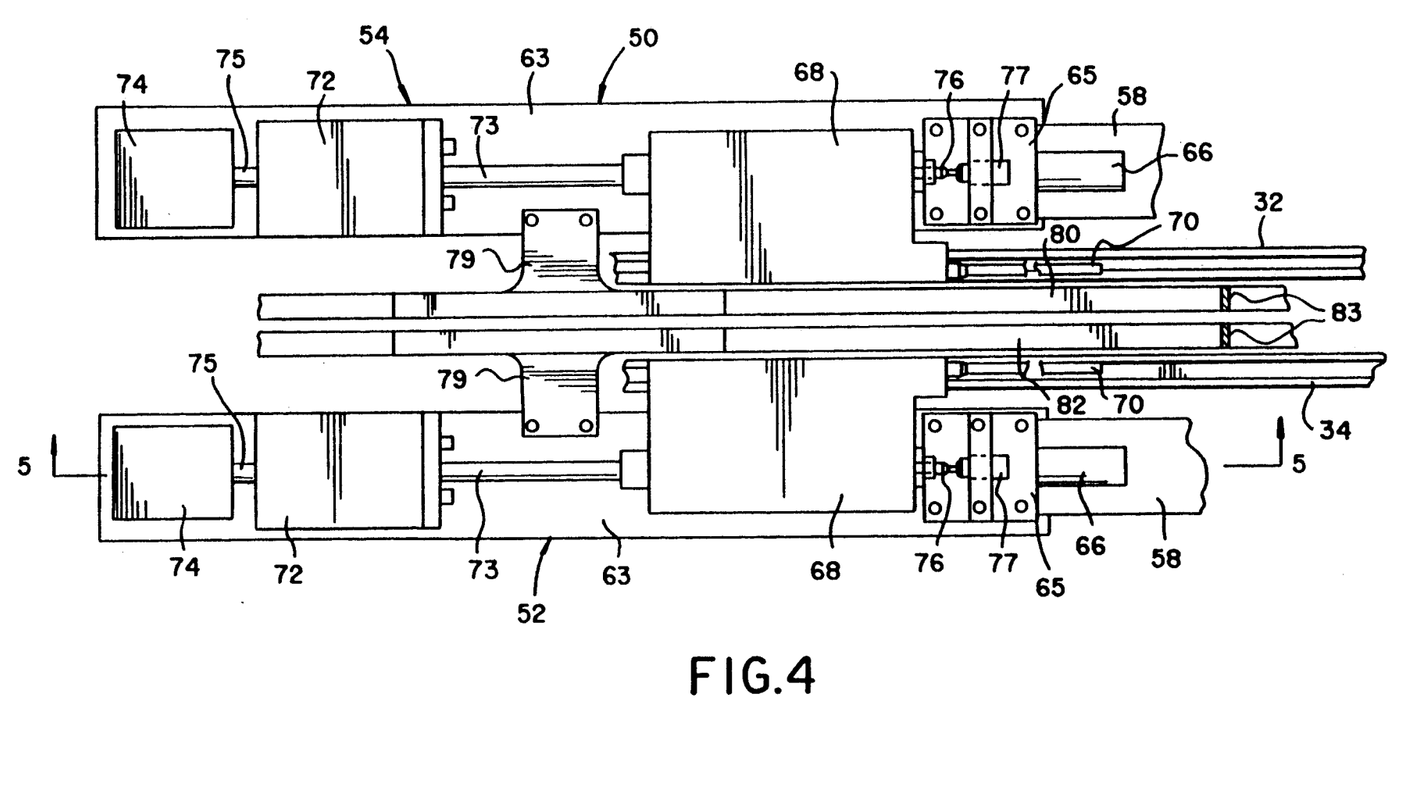
FIG. 4 is a plane view of the carriages utilized in the loader assemblies of FIG. 3.
Figure 5:
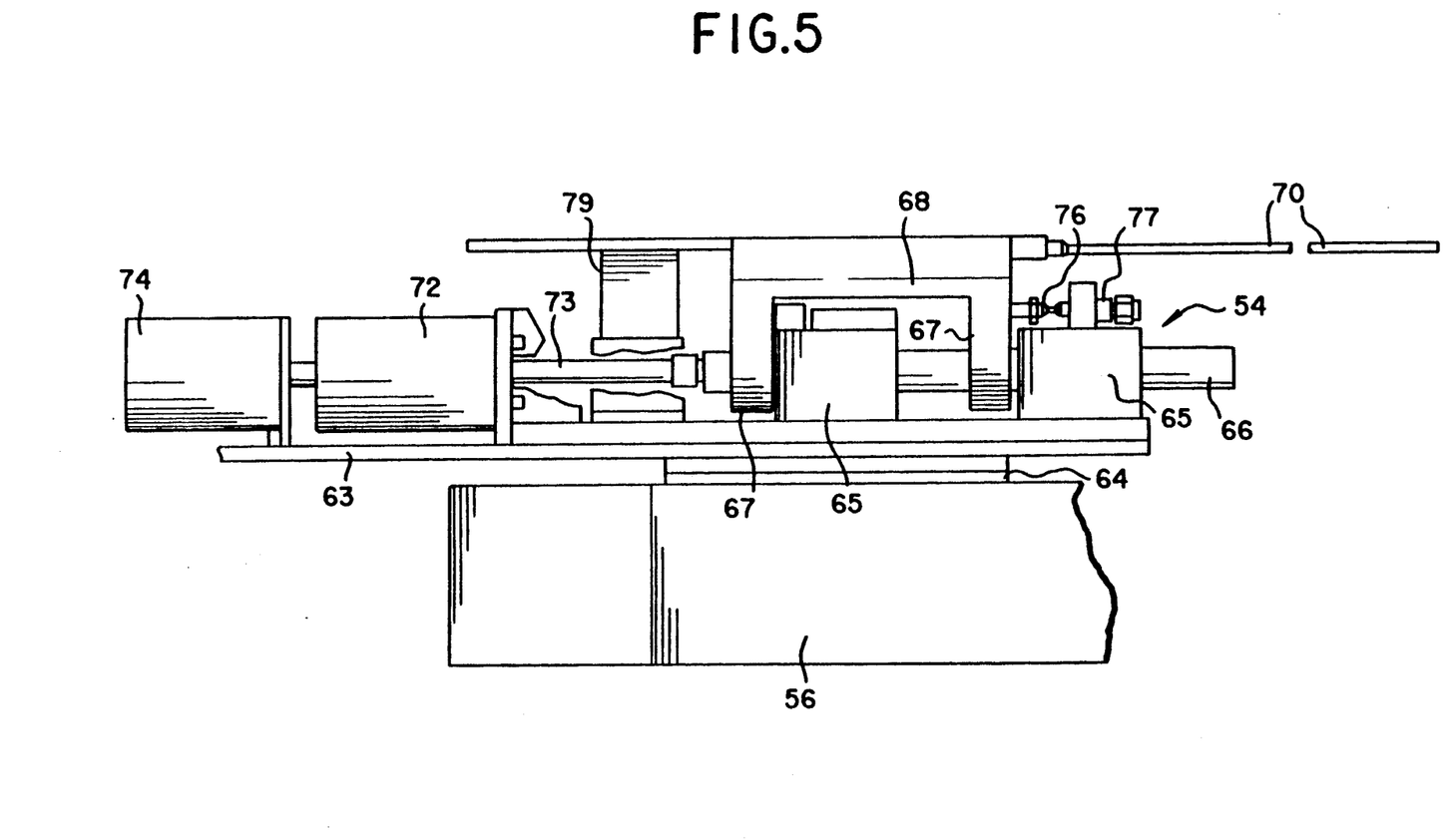
FIG. 5 is a sectional view taken along line 5—5 of FIG. 4.

Carriage 54 of each loader assembly 52, 54, as best seen in FIGS. 4 and 5, includes a mounting plate 63 affixed to a carriage plate 64 which is clamped to the linear translator belt 58. Each mounting plate carries a pair of pillow blocks 65 having a central bore through which a shaft 66 is slidingly received. A pair of clamp blocks 67 are affixed to shaft 66 and jointly carry a bracket 68 which extends laterally over to one of the tracks 32, 34 and carries at its free end a push rod 70, as best seen in FIG. 5. The push rods are respectively, longitudinally aligned with the tracks to run in their V-shaped trough and push rows of pellets positioned therein toward bushing assembly 24 (FIG. 1).

Also affixed to each mounting plate 63 is an air cylinder 72 whose plunger 73 is positioned to engage the aft or left end of shaft 66, as seen in FIGS. 4 and 5. A programmable pressure regulator 74, carried by mounting plate 63, is fluidically coupled with air cylinder 72, as indicated by fluid connection 75. A suitable programmable pressure regulator is commercially available from. ProportionAir Inc. of McCordsville, Ind. When an air cylinder 72 is pressurized, its plunger 73 extends rightward to drive shaft 66 in the same direction until a button 76 carried by the forward clamp block 67 actuates a limit switch 77 carried by the forward pillow block 65. The force with which the air cylinder holds the limit switch in its actuated state is determined by pressure regulator 74 under the control of the system controller.

Completing the description of the loader assemblies 50, 52, each mounting plate 63 also carries a bracket 79 which extends over its associated one of the tracks 32, 34 to present a free end for clamping engagement with a zone interface tape. Thus, the carriage 54 of loader assembly 50 is clamped to a zone interface tape 80 located immediately adjacent track 32, and the carriage of loader assembly 52 is clamped to a zone interface tape 82 located immediately adjacent track 34, as seen in FIG. 4. Referring back to FIG. 2, it is seen that the zone interface tapes 80, 82 are each in a continuous loop trained about separate pairs of fore and aft pulleys 84 to provide upper runs located between the tracks and extending substantially coextensively with and parallel thereto. Thus reciprocating carriage movements are duplicated by the upper zone interface tape runs. As seen in FIG. 4, the upper run of each zone interface tape carries a visible zone interface mark 83 positioned a precise distance rightward or forwardly of its associated carriage.

When the operator is to build a pellet row on track 34, for example, a cover 86 (FIG. 3) is opened by the system controller to expose this track and its associated zone interface tape 82, while a corresponding cover 87 is closed to conceal track 32 and zone interface tape 80. These covers may be of the construction disclosed in the above-cited U.S. Pat. No. 4,292,788. To build the first pellet zone, the carriage of loader assembly 52 is located by the system controller to bring the zone interface mark 83 on tape 82 to a position marking the length of the first pellet zone measured from a retractable stop 90 stationed adjacent the forward or loading end of track 34 and in close advance to bushing assembly 24, as seen in FIG. 2. The operator scoops pellets from the appropriate tray and positions them face-to-face on track 34 in a row backed up against stop 90. When the first zone pellet row is built up to a length such that the trailing face of the last pellet in the row is laterally aligned with the width of zone interface mark 83 on tape 82, the operator presses a button. In response, the system controller runs the carriage of loader assembly 52 forwardly to bring its pushrod 70 into engagement with the last pellet of the row. At this point, pressure regulator 74 is set by the system controller to a pressure value establishing a low breakaway force in air cylinder 72, and, when the resistance encountered by the pushrod exceeds this breakaway force, shaft 66 is shifted rearwardly. Limit switch 77 is de-actuated, and this event is a signal to the system controller to read the drive unit position encoder and calculate therefrom the exact first zone length.

Immediately following a zone length measurement, the system controller causes track 34 to be lowered onto the scale posts to take a measurement of the weight of the pellets in the first zone. If the zone length and weight measurements fall within specified tolerances, the systems controller signals the operator to build the second pellet zone. The carriage is backed off to position the zone interface mark on tape 82 to the length of the second zone measured from its interface with the first zone. The operator then scoops pellets of the specified second zone enrichment from the appropriate tray and builds the second zone on track 34 back to the zone interface mark. The system controller is again signal to measure the length and weight of the second zone. This process is repeated for the remaining zones to complete a full pellet load on track 34. Then, with track 34 in its elevated position and cover 86 closed, the system controller activates the translator 56 for loader assembly 52, and the carriage is propelled forwardly to push, via its push rod, the row of pellets along track 34, through bushing assembly, and into an aligned cladding tube in its loading position.

The velocity profile of the translator and the pressure profile of the pressure regulator are pre-established by the system controller during the tube loading step to minimize loading time consistent with preventing damage to the pellets due to momentary jams. If jamming occurs, limit switch 77 is deactuated to stop the carriage, which is then backed off to release pressure. The carriage is again driven forwardly to push against the pellet row with an appropriate low force to overcome the jam, which it typically does. If, after several attempts, a jam is not removed, loading is stopped, and the problem is resolved manually. While the tube loading process for track 34 is ongoing, cover 87 is opened, and the operator begins building a load of pellets on track 32 under the guidance of the system controller and its zone interface tape 80.

Figure 6:
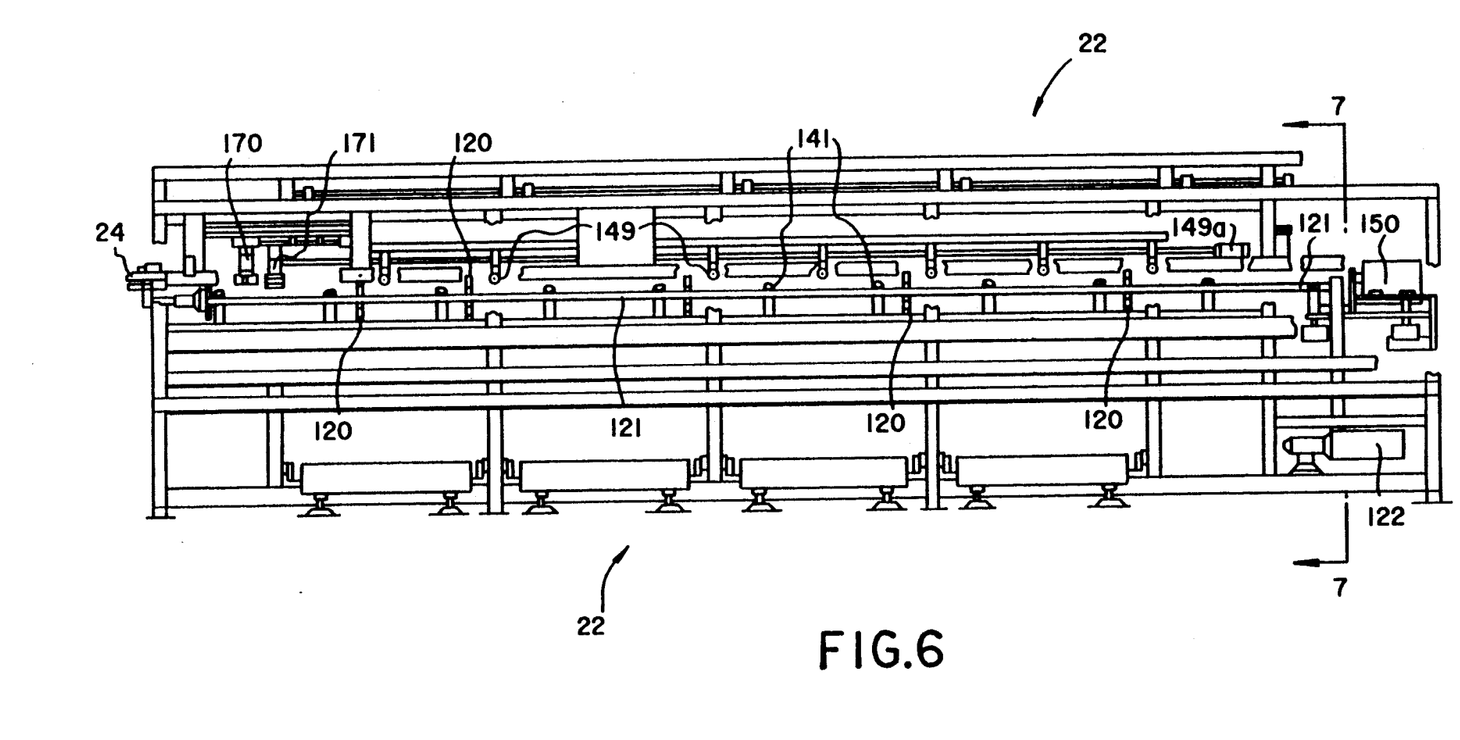
FIG. 6 is an elevational view of the cladding tube handling apparatus of FIG. 1.
Figure 7:
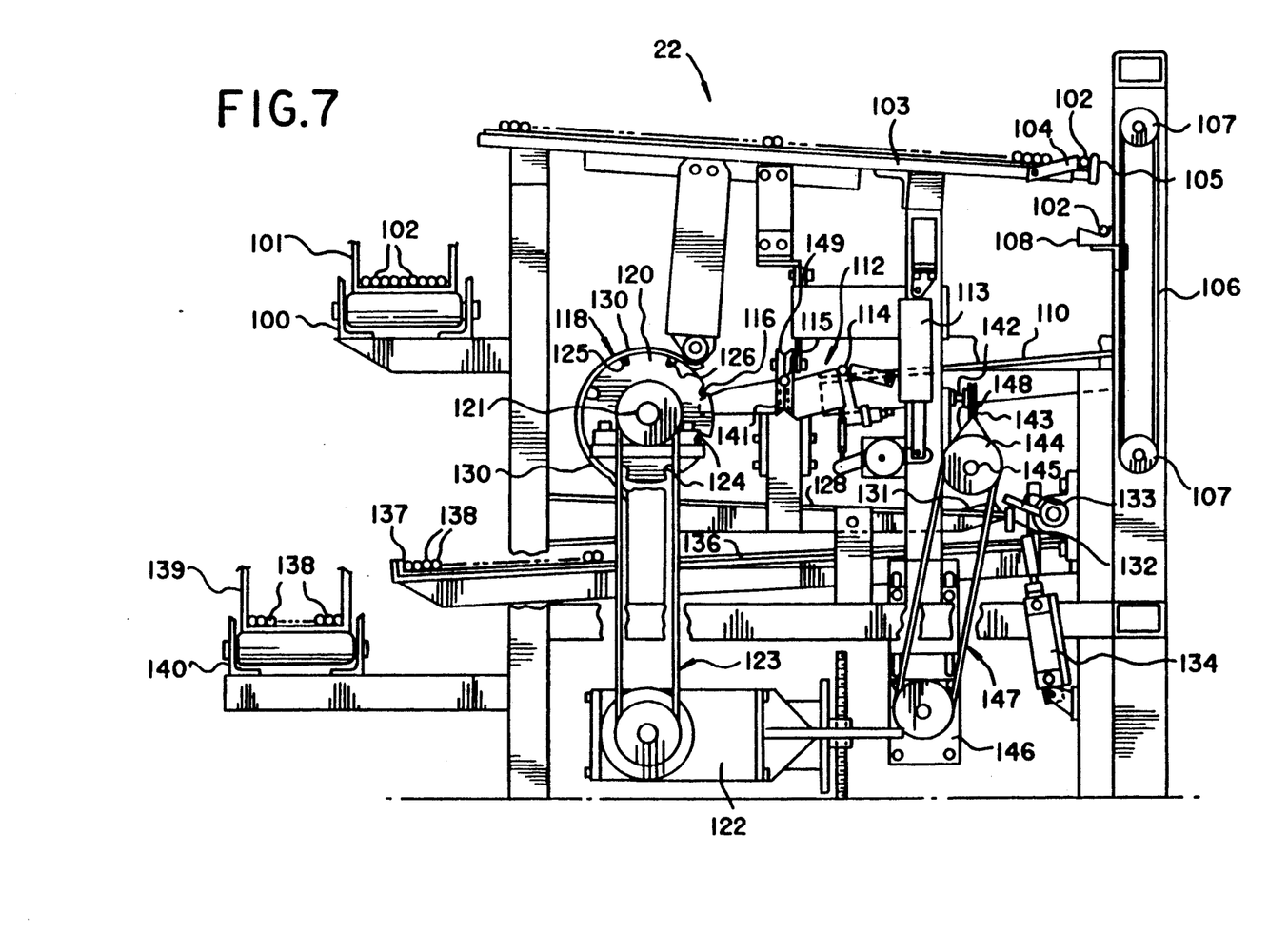
FIG. 7 is a sectional view taken along line 7—7 of FIG. 6.

Tube handling apparatus 22, as seen in FIGS. 6 and 7, includes a roller conveyor 100 for supporting an input tray 101 of empty cladding tubes 102. An operator takes cladding tubes from the input tray and places them on an input queue consisting of a longitudinally spaced set of inclined rails 103 (FIG. 7). The tubes roll down the rails and over bounce-back limiting elements 104 to a pickup position against rail end stops 105. A longitudinally spaced set of elevators, each consisting of a belt loop 106 trained about a pair of vertically spaced pulleys 107, is positioned just beyond the rail stop ends of rails 103. A ramped pickup member 108 is clamped to each of the belt loops in horizontally aligned positions. The belt loops are driven in unison to run their pickup members upperwardly and pick up a cladding tube from its pickup position on rails 103. The picked up tube rolls down the pickup member ramp to a lateral position clearing the rail ends, and the elevators descend to drop the tube off onto a longitudinally spaced set of inclined rails 110. The tubes then roll down these rails to queue up against a longitudinal aligned set of interconnected escapement mechanisms, generally indicated at 112, which are commonly operated by an air cylinder 113. Each operation of these escapement mechanisms escapes one tube from the queue to a queue position, indicated at 114, escapes one tube from the queue position to a serial number per-read position, indicated at 115, and escapes one tube from the pre-read position to an indexer load position, indicated at 116.

The indexer, generally indicated at 118, is constructed in the manner disclosed in the above-cited U.S. Pat. No. 4,292,788, and thus includes a longitudinal spaced set of carousel elements 120 (FIG. 6) mounted on a horizontal shaft 121 which is driven by a motor 122 via a belt-pulley drive arrangement generally indicated at 123. The carousel elements possess pluralities of angularly spaced peripheral recesses 124 in precise longitudinal alignment from carousel element to carousel element. Thus, each longitudinally aligned set of recesses is capable of holding one cladding tube. With counterclockwise indexing motion of the carousel elements, a cladding tube, presented to load position 116, is indexed through a pair of preload positions, indicated at 125 and 126, and then dropped off onto a set of horizontally spaced, inclined output rails 128. Arcuate retainers 130 hold the tubes in the carousel element recesses until dropped off on the output rails.

The loaded tubes roll down this first set of output rails and over bounce-back limiting elements 131 to a pickup position against rail end stops 132. A horizontal set of interconnected pickup fingers 133, commonly operated by an air cylinder 134, pick successive tubes from this pickoff position and drop them off onto a second set of horizontally spaced and aligned, inclined rails 136. The tubes roll down these rails into an output queue backed up against rail end stops 137. An operator then transfers the loaded cladding tubes, which at this stage may be considered nuclear fuel rods 138, from the output queue into an output tray 139 resting on a roller conveyor 140.

When a cladding tube is escaped to pre-read position 115, it is also resting on a longitudinally distributed set of V-rollers 141. Each V-roller is mounted on one end of a separate transverse shaft 142 whose other end carries a pulley 143. A longitudinally distributed set of drive pulleys 144 are mounted on a common shaft 145 which is bidirectional driven by a motor 146 via a interconnecting belt-pulley arrangement generally indicated at 147. Each drive pulley is drivingly connected to a separate pulley 143 by a belt 148, such that the V-rollers 141 are driven in unison. A horizontal distributed set of pivotally mounted and interconnected upper V-rollers 149 are jointly swung by an air cylinder 149a into and out of engagement with a tube in the pre-read position to press this tube into driving engagement with V-rollers 141 so that it can be bi-directional translated endwise in the longitudinal direction, i.e. in the tube axial direction.

Figure 8:
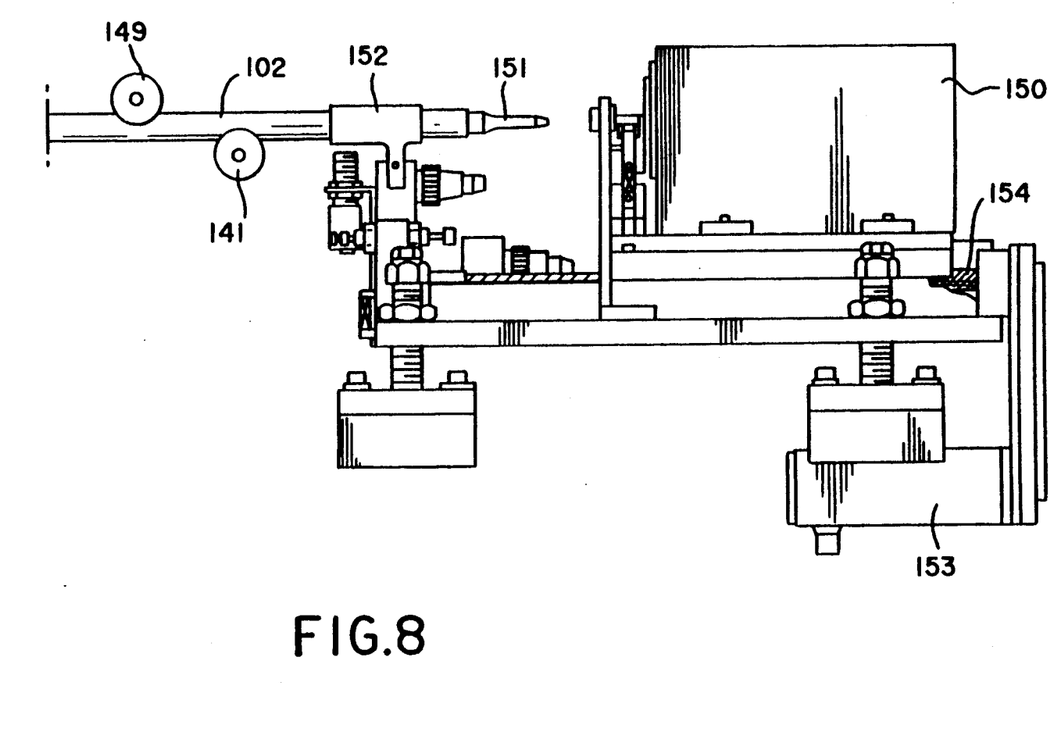
FIG. 8 is a side view of a serial number reading station utilized in the cladding tube handling apparatus of FIG. 6.
Figure 9:
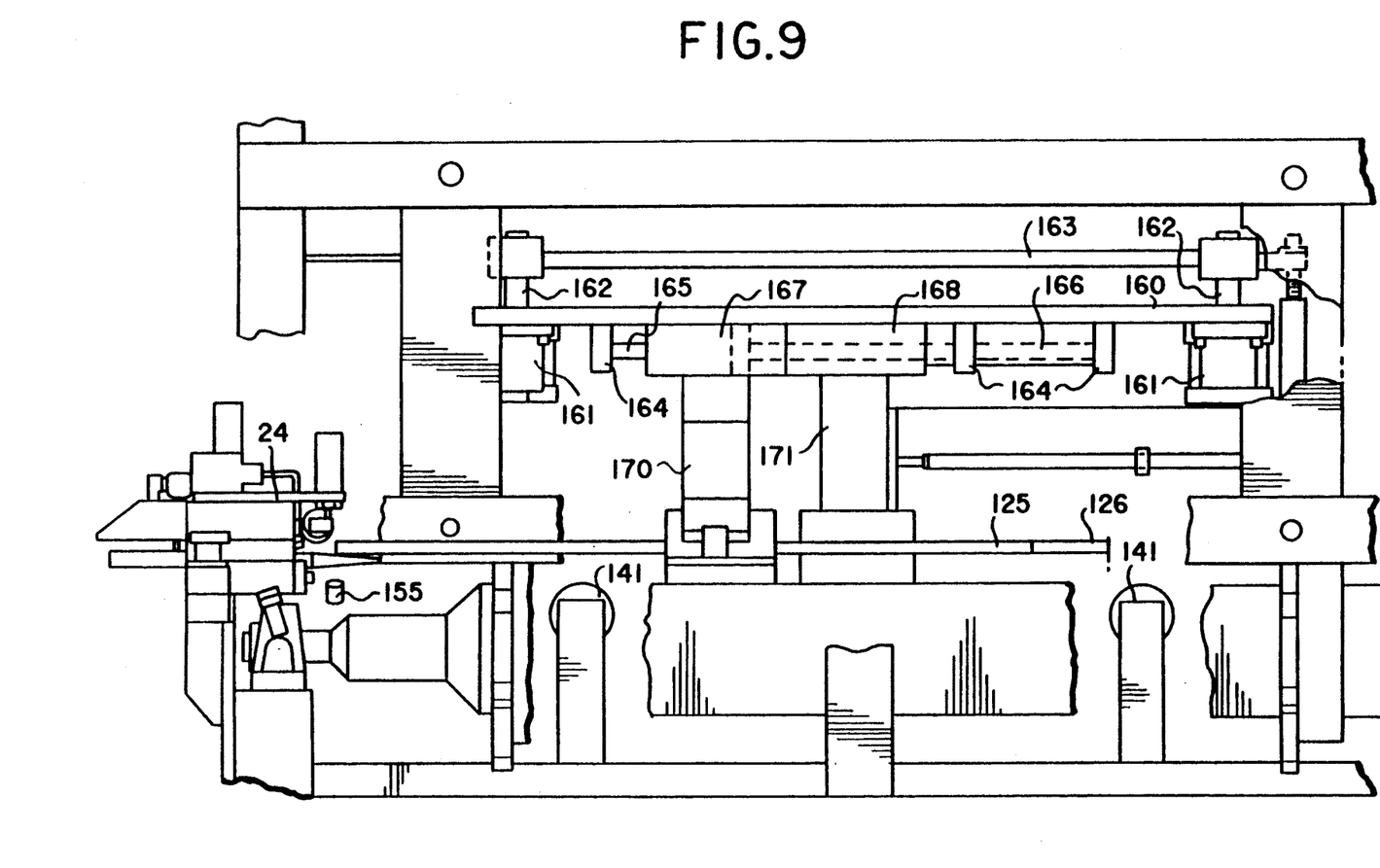
FIG. 9 is a fragmentary elevational view of the portion of the cladding tube handling apparatus proximate the bushing assembly.

Turning to FIG. 8, a cladding tube 102 residing in the pre-read position is axially aligned with reader 150 designed to read a unique serial number borne by an endplug 151 welded to one end of each cladding tube. When a tube is escaped to the pre-read position, it is axially translated by V-rollers 141 toward reader 150 into a read position where it is held by clamps 152 in the manner disclosed in commonly assigned U.S. Pat. No. 4,980,119. The reader is then reciprocated by a motor 153 driving a lead screw 154 into serial number reading relation with endplug 151. The serial number read from the endplug is entered into the system controller for inventory and tracking purposes. Once the endplug serial number is read and entered, V-rollers are driven in the opposite direction to axially translate the cladding tube in the direction of bushing assembly 24 until its open end triggers a proximity sensor 155 (FIG. 9). Thus the cladding tubes, regardless of length, are successively presented to the indexer loading position 116 (FIG. 7) with their open ends at a desired longitudinal position.

Turning to FIG. 9, when the indexer has indexed a pair of cladding tubes into pre-load positions 125 and 126 seen in FIG. 7, they must then be axially positioned into loading positions juxtaposed with bushing assembly 24. To this end, a mounting platform 160 carries a pair of longitudinally spaced air cylinders 161 whose plungers 162 are affixed to an upper support plate 163. Joint activation of the air cylinders is thus effective to raise and lower mounting platform 160. Affixed to the underside of this mounting platform in transverse relation are a pair of powered slide units. Each powered slide unit includes two pairs of longitudinally spaced end brackets 164 serving to mount separate pairs of horizontal guide rods 165 and 166. A pneumatically powered saddle 167 is slidingly mounted by guide rod pair 165, while the separate pneumatically powered saddle 168 is slidingly mounted by guide rod pair 166. Suitable powered slide units are commercially available from PHD, Inc. of Ft. Wayne, Ind. Depending from saddle 167 is a gripper 170, and depending from saddle 168 is a gripper 171. While the indexer is indexing the tubes into and out of the preload positions, air cylinders 161 are actuated to raise the mounting platform and thus elevate the grippers to non-interfering positions. With a pair of empty tubes in the pre-load positions, the gripper are opened, lowered into grasping relation with the two tubes, and closed to securely grip the tubes, with gripper 170 grasping a tube in preload position 125, and gripper 171 grasping a tube in preload position 126. The powered slide units are then actuated to advance the tubes into loading positions with their open ends in communication with bushing assembly 24. After both tubes have been loaded with pellets, the powered slide units retract them to the pre-load positions. The grippers are opened and raised to permit the loaded tubes to be indexed out of the pre-load positions and empty tubes to be indexed into the pre-load positions.

Figure 10:
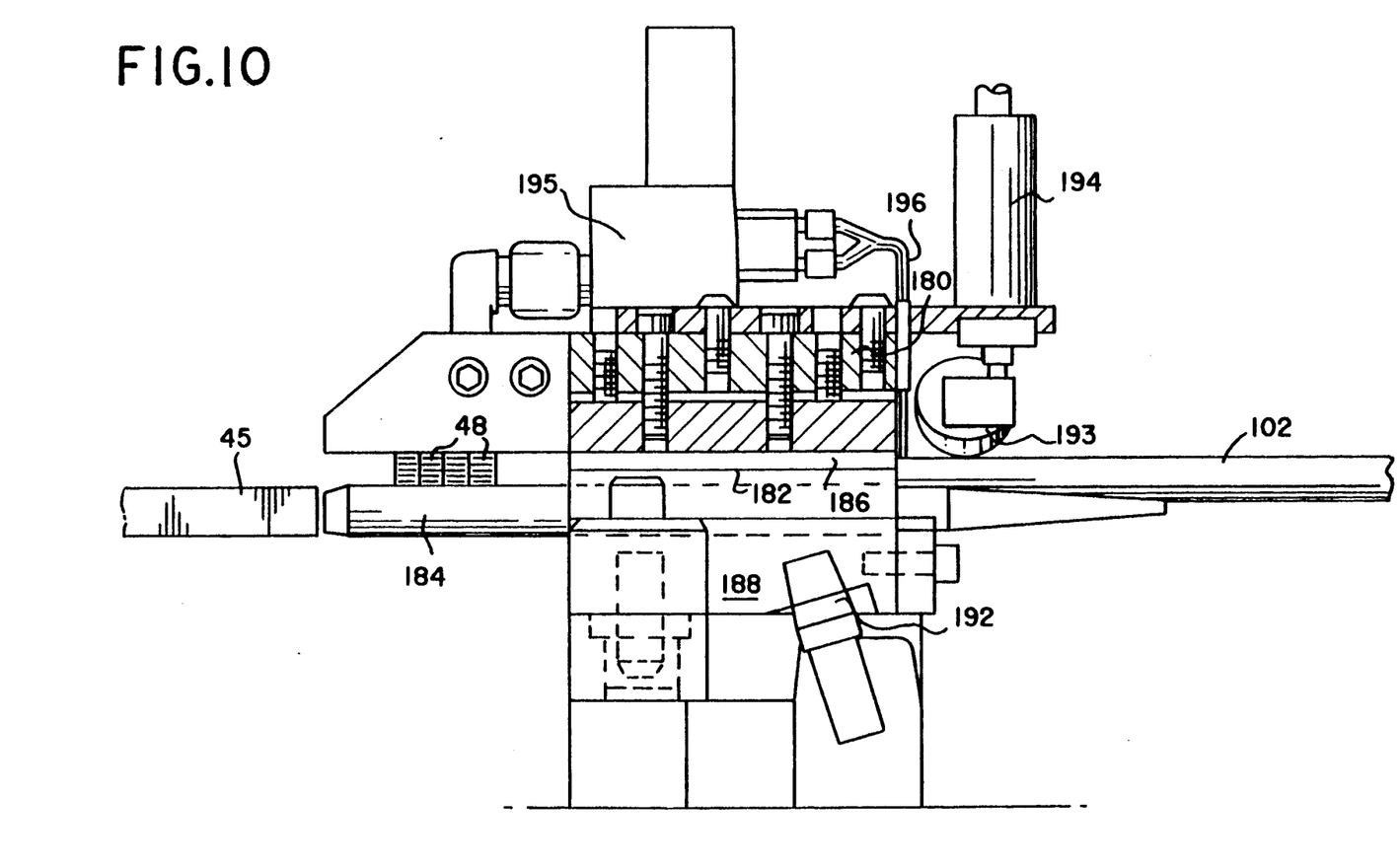
FIG. 10 is a longitudinal sectional view of the bushing assembly of FIG. 1.
Figure 11:
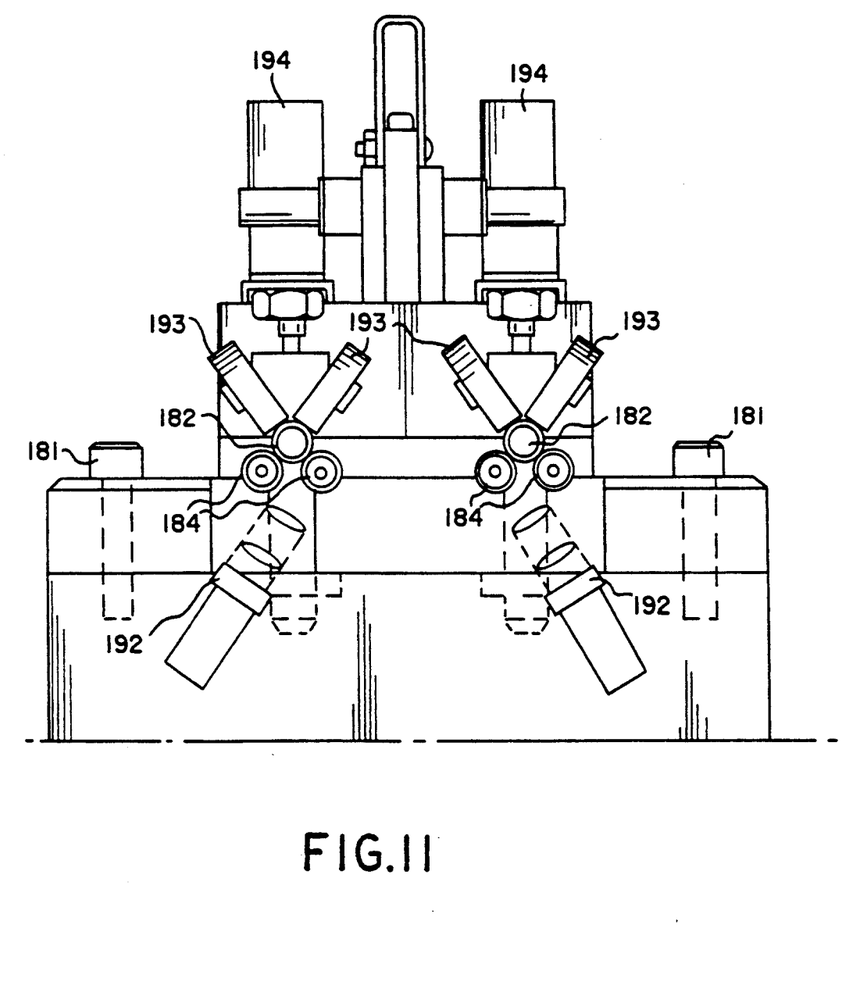
FIG. 11 is an end view of the bushing assembly of FIGS. 1 and 10.

Bushing assembly 24, as seen in FIGS. 10 and 11, includes a housing 180 which is installed in a fixed position by bolts 181. Thus, different bushing assemblies can be readily changed out to accommodate different pellet sizes. The housing includes a pair of side-by-side, longitudinal passageway 182 through which the pellet rows pass from the tracks 32, 34 into the pair of cladding tubes advanced into their loading positions. Each passageway is partially defined by a pair of pins 184 protruding beyond the passageway entrance end to present blunt ends in contiguous relation with the ends of the track rods 45. The other, tapered ends of the pins protrude beyond the exit ends of the passageways. With the pair of pins of each passageway in respective end-to-end alignment with the pair of rods of each track, pellets 48 can smoothly transition from the track rods to the bushing pins and on to the passageway entry ends.

To prevent the pellets from tumbling over during transit through the bushing assembly, each passageway is further defined by a pair of longitudinally elongated carbide rails 186 positioned in respective, diametrically opposed relation to the pair of pins 184. With the pellets supported by and sliding over the peripheral surfaces of the pins, while being guided by the opposed rails, the pellets are assured of a smooth transition through the bushing passageways. Positioned beneath the pins of each passageway within housing 180 is an open trap 188 which is evacuated through a connection 192 to exhaust pellet particles and dust from the bushing assembly.

The tapered ends of the pins serve to guide the advancing cladding tubes into their loading positions with their open ends communicating with the passageways. Additional tube guidance is provided by a separate pair of rollers 193 disposed above and immediately beyond the exit end of each passageway. Each roller pair is carried at the plunger free end of a separate air cylinder 194. In their retracted positions the roller pairs cooperate with the tapered pin ends in guiding the pair of tubes into their loading positions. Once there, the air cylinders are actuated to press the roller pairs into clamping engagement with the tubes to preserve their alignment with the passageways. Optical sensors 195 equipped with fiber optic pickups 196 detect the arrival of the tubes in their loading positions and signal the system controller that tube loading can commence upon completion of a pellet row build.

Once all of the pellets of a row have been pushed into a cladding tube, it remains to check the plenum chamber length before the tube is retracted from its loading position. Plenum length is the dimension from the tube open end measured inwardly to the trailing face of the last pellet in the loaded row or column. In the manner disclosed in the above-cited U.S. Pat. No. 4,980,119, a plenum length measurement is taken by advancing a carriage pushrod into the tube and touching off against the last pellet in the row. The associated pressure regulator 74 establishes an appropriated breakaway force in the air cylinder 72 to assure pellet row compaction before the limit switch 77 is deactuated, at which time the system controller is signal to take the drive unit encoder reading from which plenum length can be calculated.

From the foregoing description, it is seen that the present invention provides an improved nuclear fuel pellet loading system on an expedited, semi-automated basis. Since various changes may be made in the construction set forth in the Detailed Description may be made without departing from the scope of the invention, it is intended that matters of detail be taken as illustrative and not in a limiting sense.

Having described the invention, what is intended to secure by Letters Patent is:

1. An apparatus for loading nuclear fuel pellets into the open one ends of elongated cladding tubes having their other ends closed by end plugs; said apparatus comprising, in combination:
   A. first and second elongated tracks in which fuel pellets are manually placed in face-to-face relation to form respective first and second rows of fuel pellets;
   B. a cladding tube handler for accommodating a batch of cladding tubes arranged in parallel, serial relation, said handler including
      1) an indexer for positioning successive pairs of empty cladding tubes into first and second preloading positions respectively axially aligned with said first and second tracks, and
      2) reciprocating gripper means for axially translating the pair of cladding tubes between said first and second preloading positions and first and second loading positions proximate said first and second tracks;
   C. a stationary bushing assembly including
      ((b 1) a first pellet passageway having an entry end juxtaposed with a loading end of said first track and an exit end juxtaposed with the open end of the cladding tube in said first loading position; and
      (2) a second pellet passageway having an entry end juxtaposed with a loading end of said second track and an exit end juxtaposed with the open end of the cladding tube in said second loading position; and
   D. first and second independent pusher means, said first pusher means pushing a row of fuel pellets along said first track, through said first passageway and into the cladding tube in said first loading position, and said second pusher means pushing a row of fuel pellets along said second track, through said second passageway and into the cladding tube in said second loading position;
   E. whereupon, said gripper means retracks the loaded pair of cladding tubes to said first and second preloading positions, and said indexer replaces the load pair of cladding tubes with a next pair of cladding tubes in said first and second preloading positions.

2. The apparatus defined in claim 1, wherein the batch of cladding proprogates serially through said tube handler from an input queue of empty cladding tubes through a serial number reading position and said indexer to a output queue of loaded cladding tubes, said tube handler further including a serial number reader and means for axially translating each successive cladding tube propagating into said serial number reading position first in one direction to locate the endplug thereof in position for reading a unique serial number therein by said serial number reader and then in an opposite direction to properly locate the cladding tube in preparation for positioning to one of said first and second preloading positions by said indexer.

3. The apparatus defined in claim 1, wherein each said first and second pusher means includes
   1) a carriage mounted for forward and aft linear movement along a path parallel to said first and second tracks,
   2) a motor for propelling said carriage in forward and aft motion along said path,
   3) a push element mounted to said carriage for limited motion parallel to said carriage path between forward and aft positions, said push element positioned to engage a trailing fuel pellet of a row of fuel pellets in one of said first and second tracks during forward motion of said carriage,
   4) a fluidic actuator mounted to said carriage for biasing said push rod to said forward position,
   5) a controllable fluidic pressure regulator fluidally coupled with said actuator for establishing a adjustable bias force holding said push rod in said forward position; and
   6) a sensor for halting forward propulsion of said carriage by said motor in response to the detection of motion of said push element away from said forward position when the resistance to the pushing motion of said push element by the row of fuel elements exceeds said bias force.

4. The apparatus defined in claim 3, wherein each said first and second tracks includes a separate retractable stop stationed adjacent the loading end thereof and against which the leading pellet of a pellet row is engaged during formation of the pellet row, said stop be retracted to permit loading a completed pellet row into a cladding tube in said loading position.

5. The apparatus defined in claim 4, which further includes a separated position encoder for generating data indicative of the position of the trailing pellet engaging tip of each said push element relative to one of said retractable stops.

6. The apparatus defined in claim 5, wherein each pellet row is formed as a succession of pellet zones of specified fuel enrichments, upon the formation of each pellet zone, the appropriate one of said carriages is propelled forwardly to touch off the tip of said pusher element mounted thereon against the trailing pellet in the pellet zone to enable one of said encoders to generate data indicative of the pellet zone length.

7. The apparatus defined in claim 4, which further includes pellet zone interface indicator means associated with said first and second tracks, said indicator means being variously positioned along said first and second tracks to indicate the row length of each pellet zone, thus to aid in manually forming each pellet zone to the appropriate row length.

8. The apparatus defined in claim 7, wherein said zone interface indicator means includes
   1) a first tape loop having a first linear tape run extending in side-by-side, substantially coextensive relation with said first track, and 2) a second tape loop having a second linear tape run extending in side-by-side, substantially coextensive relation with said second track, said first and second tape runs each having at least one zone interface marking thereon, 3) said first and second tape runs being translated to selectively locate said markings at positions along said first and second tracks to indicate specified locations for the trailing sides of the last pellets in each of the pellet zones.

9. The apparatus defined in claim 8, wherein said first tape loop is affixed to said first pusher means such that said first tape run moves in unison with said carriage thereof, and said second tape loop is affixed to said second pusher means such that said second tape run moves in unison with said carriage thereof.

10. The apparatus defined in claim 2, wherein each of said first and second tracks includes an elongated rail having a pair of coextensive laterally spaced side pockets of semicircular cross section and a coextensive cylindrical, metallic rod slidingly received in each said side pocket, said rods having peripheral surfaces providing underlying support for the fuel pellets standing on their peripheral edges.

11. The apparatus defined in claim 10, wherein said bushing assembly further includes a separate pair of cylindrical pins extending through each of said first and second pellet passageways as axial extensions of said rods of said first and second tracks for providing smooth transition of the fuel pellets into the passageway entry ends, said pins having tapered ends extending beyond said passageways to guide the open end of a cladding tube to a location providing smooth transition of fuel pellets from said passageways into the cladding tubes.

12. The apparatus defined in claim 2, which further includes pellet zone interface indicator means associated with said first and second tracks, said indicator means being variously positioned along said first and second tracks to indicate the row length of each pellet zone, thus to aid in manually forming each pellet zone to the appropriate row length.

13. The apparatus defined in claim 12, wherein each said first and second pusher means includes 1) a carriage mounted for forward and aft linear movement along a path parallel to said first and second tracks, 2) a motor for propelling said carriage in forward and aft motion along said path, 3) a push element mounted to said carriage for limited motion parallel to said carriage path between forward and aft positions, said push element positioned to engage a trailing fuel pellet of a row of fuel pellets in one of said first and second tracks during forward motion of said carriage, 4) a fluidic actuator mounted to said carriage for biasing said push rod to said forward position, 5) a controllable fluidic pressure regulator fluidically coupled with said actuator for establishing a adjustable bias force holding said push rod in said forward position; and 6) a sensor for halting forward propulsion of said carriage by said motor in response to the detection of motion of said push element away from said forward position when the resistance to the pushing motion of said push element by the row of fuel elements exceeds said bias force.

14. The apparatus defined in claim 13, wherein each said first and second tracks includes a separate retractable stop stationed adjacent the loading end thereof and against which the leading pellet of a pellet row is engaged during formation of the pellet row, said stop be retracted to permit loading a completed pellet row into a cladding tube in said loading position.

15. The apparatus defined in claim 14, which further includes a separated position encoder for generating data indicative of the position of the trailing pellet engaging tip of each said push element relative to one of said retractable stops.

16. The apparatus defined in claim 15, wherein each pellet row is formed as a succession of pellet zones of specified fuel enrichments, upon the formation of each pellet zone, the appropriate one of said carriages is propelled forwardly to touch off the tip of said pusher element mounted thereon against the trailing pellet in the pellet zone to enable one of said encoders to generate data indicative of the pellet zone length.

17. The apparatus defined in claim 16, wherein said zone interface indicator means includes 1) a first tape loop having a first linear tape run extending in side-by-side, substantially coextensive relation with said first track, and 2) a second tape loop having a second linear tape run extending in side-by-side, substantially coextensive relation with said second track, said first and second tape runs each having at least one zone interface marking thereon, 3) said first and second tape runs being translated to selectively locate said markings at positions along said first and second tracks to indicate specified locations for the trailing sides of the last pellets in each of the pellet zones.

18. The apparatus defined in claim 17, wherein said first tape loop is affixed to said first pusher means such that said first tape run moves in unison with said carriage thereof, and said second tape loop is affixed to said second pusher means such that said second tape run moves in unison with said carriage thereof.

* * * * *